(12) United States Patent
Yoshida et al.

(10) Patent No.: US 12,554,571 B2
(45) Date of Patent: Feb. 17, 2026

(54) ERROR CAUSE ESTIMATION DEVICE AND ESTIMATION METHOD

(71) Applicant: Hitachi High-Tech Corporation, Tokyo (JP)

(72) Inventors: Yasuhiro Yoshida, Tokyo (JP); Masayoshi Ishikawa, Tokyo (JP); Kouichi Hayakawa, Tokyo (JP); Masami Takano, Tokyo (JP); Fumihiro Sasajima, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 97 days.

(21) Appl. No.: 17/908,731

(22) PCT Filed: Mar. 31, 2020

(86) PCT No.: PCT/JP2020/014727
§ 371 (c)(1),
(2) Date: Sep. 1, 2022

(87) PCT Pub. No.: WO2021/199227
PCT Pub. Date: Oct. 7, 2021

(65) Prior Publication Data
US 2023/0122653 A1 Apr. 20, 2023

(51) Int. Cl.
*G06F 11/00* (2006.01)
*G06F 11/07* (2006.01)
*G06F 11/34* (2006.01)

(52) U.S. Cl.
CPC ........ *G06F 11/079* (2013.01); *G06F 11/3447* (2013.01)

(58) Field of Classification Search
CPC .............. G06F 11/079; G06F 11/3447; G06F 11/2252; G06F 11/2257; G06F 11/2263
See application file for complete search history.

(56) References Cited

U.S. PATENT DOCUMENTS

2006/0293778 A1  12/2006  Kay et al.
2018/0082873 A1   3/2018  Ohmori et al.
(Continued)

FOREIGN PATENT DOCUMENTS

CN   110657890 A   1/2020
JP     4398441 B2   1/2010
(Continued)

OTHER PUBLICATIONS

International Search Report, PCT/JP2020/014727, Jun. 9, 2020, 2 pgs.
International Preliminary Report on Patentability, PCT/JP2020/014727, Jan. 11, 2022, 3 pgs.
Taiwan Office Action, Application No. 110108273, Jan. 28, 2022, 6 pgs.
Korean Office Action dated Jun. 30, 2025 for the Korean Patent Application No. 10-2022-7030371.
(Continued)

*Primary Examiner* — Philip Guyton
(74) *Attorney, Agent, or Firm* — Volpe Koenig

(57) ABSTRACT

An error cause estimation device comprises a feature value generation unit for using data transmitted from the outside to generate feature values suitable for a machine learning model; a model database having a plurality of error prediction models, for determining whether an error has occurred using the feature values as input data; a model evaluation unit for evaluating the performance of an error prediction model by comparing a prediction result of the error prediction model and an actually measured error; a model selection unit for selecting from the model database an error prediction model for which an evaluation value calculated by the model evaluation unit is greater than or equal to a preset defined value; and an error prediction model generation unit for generating a new error prediction model with respect to the measured error when no corresponding error prediction model has been selected by the model selection unit.

14 Claims, 11 Drawing Sheets

(56) References Cited

U.S. PATENT DOCUMENTS

| | | | |
|---|---|---|---|
| 2018/0107928 A1 | 4/2018 | Zhang et al. | |
| 2018/0307203 A1 | 10/2018 | Aizawa et al. | |
| 2019/0129918 A1 | 5/2019 | Moon et al. | |
| 2019/0148246 A1 | 5/2019 | Zhan et al. | |
| 2020/0003679 A1 | 1/2020 | Hsiung et al. | |
| 2020/0014761 A1 | 1/2020 | Kawaai et al. | |
| 2020/0125970 A1 | 4/2020 | Toyama | |
| 2021/0117863 A1* | 4/2021 | Soleimani | G06N 5/045 |
| 2021/0136098 A1* | 5/2021 | Stergioudis | G06N 20/10 |
| 2021/0150391 A1* | 5/2021 | Guillemet | G06N 5/01 |
| 2023/0122653 A1* | 4/2023 | Yoshida | G06F 11/0706 |
| | | | 714/37 |
| 2023/0325413 A1* | 10/2023 | Yoshida | G06N 20/00 |
| 2023/0402249 A1* | 12/2023 | Yoshida | H01J 37/28 |

FOREIGN PATENT DOCUMENTS

| | | |
|---|---|---|
| JP | 6530779 B2 | 6/2019 |
| JP | 2019-537839 A | 12/2019 |
| KR | 20190048840 A | 5/2019 |
| KR | 20190098254 A | 8/2019 |
| KR | 102039394 B1 | 11/2019 |
| TW | 201930858 A | 8/2019 |
| WO | 2018/173121 A1 | 9/2018 |

\* cited by examiner

ERROR CAUSE ESTIMATION DEVICE AND ESTIMATION METHOD

TECHNICAL FIELD

The present invention relates to an error cause estimation device and an error cause estimation method.

BACKGROUND ART

A semiconductor measurement device or a semiconductor inspection device performs an inspection operation or a measurement operation for each inspection point determined to be abnormal on the surface of a semiconductor wafer, in accordance with setting parameters called a recipe. In the adjustment of the recipe parameter, an engineer generally optimizes each item by manual work, in accordance with an attribute of a measurement/inspection target, characteristics of a device, and the like. Thus, for example, in a case of using a recipe for which the adjustment is not sufficient or in the case where the characteristics of the device are changed due to a change with time, there is a possibility that an error occurs in the inspection operation or the measurement; operation. Such an error is called a recipe error as an error caused by the contents of the recipe.

When such a recipe error occurs, it is common that a service engineer analyzes device internal data from the semiconductor measurement device or the semiconductor inspection device to specify a cause location. However, with miniaturization and diversification of semiconductors, the number of recipes and recipe setting items increase, recipe creation becomes complicated, and the like. Therefore, it takes time to specify the cause of the recipe error, which causes a decrease in the operation rate of the device.

PTL 1 discloses that, by a method of identifying a failure in a measurement tool used to measure a desired dimension of a microelectronic mechanism, a user can quickly concentrate on a recipe having the most problem and determine a root cause by using an error log typically present in any measurement tool, and this process can be automated.

PTL 2 discloses, as a technique for estimating a cause when a defect occurs on a machined surface of a workpiece, a machining defect cause estimation device that uses a machine learning device to observe an inspection result of the machined surface of the workpiece by an inspection device, as a state variable, acquires label data indicating an occurrence cause of the machined surface defect, and learns the state variable and the label data in association with each other.

CITATION LIST

Patent Literature

PTL 1: JP 4398441 B
PTL 2: JP 6530779 B

SUMMARY OF INVENTION

Technical Problem

In the method disclosed in PTL 1, the root cause can be automatically determined by using the typical error log. However, PTL 1 does not specifically disclose what type of error the normalized number of errors for the recipe used by the measurement tool is.

The application range of the machining defect cause estimation device disclosed in PTL 2 is limited to a case, where the state variable and the label data can be learned in association with each other. In other words, an annotation is required.

When the cause of a recipe error semiconductor inspection device or the like, a mechanism by which an error occurs depends on a product/manufacturing process. Further, there are a wide variety of errors. Therefore, it is difficult to assume and cover error causes in advance for use in learning.

An object of the present invention is to estimate a cause of various types of errors that occurs even when there has been no prior annotation of error causes.

Solution to Problem

According to the present invention, an error cause estimation device provided with: a feature value generation unit for using data transmitted from the outside to generate feature values suitable for a machine learning model; a model database having at least one or more error prediction models, which are used in determining whether an error has occurred using the feature values as input data; a model evaluation unit for evaluating the performance of an error prediction model by comparing a prediction result of the error prediction model and an actually measured true error result; a model selection unit for selecting from the model database an error prediction modes for which an evaluation value calculated by the model evaluation unit is greater than or equal to a preset defined value; and an error prediction model generation unit for generating a new error prediction model with respect to the measured error when no corresponding error prediction model has been selected the model selection unit.

According to the present invention, an error cause estimation method includes a feature value generation step of using data transmitted from an outside to generate feature values suitable for a machine learning model, a model evaluation step of evaluating performance of an error prediction model used in determining whether an error has occurred using the feature values as input data, by comparing a prediction result of the error prediction model, which is stored in a model database and an actually measured true error result, a model selection step of selecting, from the model database, the error prediction model for which an evaluation value calculated by the model evaluation step is greater than or equal to a preset defined value, and an error prediction model generation step of generating a new error prediction model with respect to the measured error when corresponding error prediction model has been selected by the model selection step.

Advantageous Effects of Invention

According to the present invention, it is possible to estimate the cause of various types of errors that occur, even when there has been no prior annotation of error causes.

DESCRIPTION OF EMBODIMENTS

Figure 1:
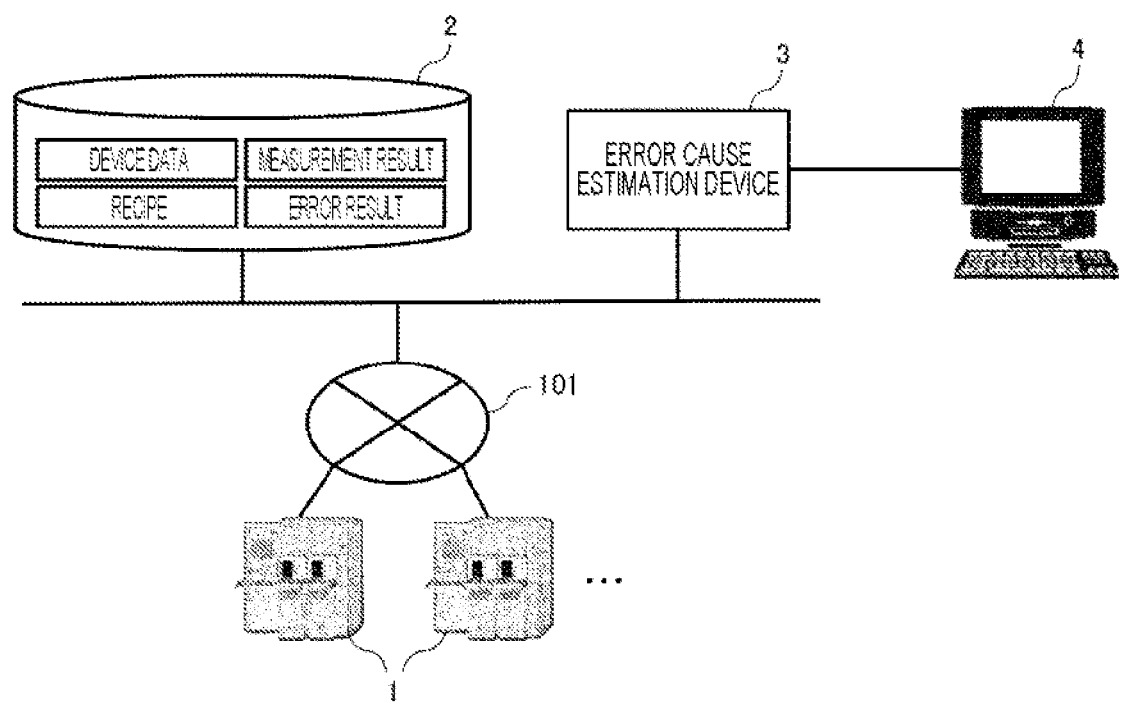
FIG. 1 is a block diagram illustrating an information processing system including an error cause estimation device according to Example 1.

In an embodiment described below, a "semiconductor inspection device" includes a device that measures dimensions of a pattern formed on a surface of a semiconductor wafer, a device that inspects the presence or absence of a defect of a pattern formed on a surface of a semiconductor wafer, a device that inspects the presence or absence of a defect of a bare, wafer on which a pattern is not formed, or the like, and also includes multifunction device in which a plurality of the devices are combined.

In addition, in the embodiment described below, "inspection" is used in the sense of measurement or inspection. An "inspection operation" is used in the sense of a measurement operation or an inspection operation. An "inspection target" refers to a wafer to be measured or inspected or a measurement or inspection target region in the wafer.

In the present specification, an error cause estimation device is synonymous with the error cause estimation device and an error cause estimation method is synonymous with the error cause estimation method.

An error cause estimation device and an error cause estimation method according to the desirable embodiment will be described below.

Desirably, the estimation device includes a feature value generation unit, a model database, a model evaluation unit, a model selection unit, and an error prediction model generation unit, and further includes a data classifying unit that classifies error data in input data for error cause.

In the estimation device, it is desirable that the error prediction model generation unit separately labels the classified error cause, generates the error prediction model with the label, and transmits the error prediction model to the model database.

It is desirable that the estimation device further include a model analysis unit that quantifies a contribution degree of the feature value to an error determination result in an error prediction model selected by the model selection unit.

It is desirable that the estimation device have a configuration in which the feature, value, of the error prediction model having a high value of contribution degree calculated by the model analysis unit is presented to a user as an error cause candidate.

In the estimation device, when the model selection unit selects a plurality of error prediction models, the model evaluation unit calculates a model evaluation value, and a configuration in which the contribution degree of each feature value calculated by the model analysis unit is corrected by using the model evaluation value, and the feature value of the error prediction model having a high value of corrected contribution degree calculated from each of the plurality of error prediction models is presented to a user as an error cause candidate is provided.

It is desirable that the estimation device further include another error prediction model generation unit that generates an error prediction model such that, when the error cause candidate is corrected by the user, the corrected error cause is included in an analysis result of the model analysis unit.

It is desirable that the estimation device further include an error cause label database that stores a relationship of the feature value generated by the feature value generation unit and an error cause corresponding to at least any one of combinations of the feature values, and an error cause label acquisition unit that assigns a corresponding error cause to the feature value corresponding to the contribution degree quantified by the model analysis unit, by using a label relationship in the error cause label database.

In the estimation device, desirably, the error prediction model generation unit generates a new error prediction model by using an operation step in which an error as a target has occurred and input data in a previous operation step.

Regarding a relationship between the configuration of the estimation device and the steps of the estimation method, the feature value generation unit corresponds, to the feature value generation step, the model evaluation unit corresponds to the model evaluation step, the model selection unit corresponds to the model selection step, and the error prediction model generation unit corresponds to the error prediction model generation step. In addition, the steps are not limited to those performed in one device, and may be performed by a plurality of devices arranged in distributed manner.

Example 1

FIG. 1 illustrates an example of an information processing system including an error cause estimation device according to Example 1.

In FIG. 1, a semiconductor inspection device 1 is connected to a database 2 and an error cause estimation device 3 via a network 101. The error cause estimation device 3 is connected to a terminal 4 (GUI). The error cause estimation device 3 estimates a cause of an error in an inspection operation performed by the semiconductor inspection device 1.

Data transmitted from the semiconductor inspection device 1 includes, for example, device data, a measurement recipe (simply referred to as a "recipe" below in some cases), a measurement result, and an error result. The recipe may include the number of measurement points, coordinate information of a measurement point (evaluation point EP), an image capturing condition when an image is captured, an image capturing sequence, and the like. In addition, the recipe may include coordinates of an image, image capturing conditions, and the like acquired at a preparation stage for measuring the measurement point, together with the measurement point.

The device data includes a device-specific parameter, device difference correction data, and an observation condition parameter. The device-specific parameter is a correction parameter used to operate the semiconductor inspection device 1 according to the defined specification. The device difference correction data is a parameter used to correct a device difference between semiconductor inspection devices. The observation condition parameter is, for example, a parameter for defining an observation condition of a scanning electron microscope (SEM) such as an acceleration voltage of an electron optical system.

The recipe includes, as recipe parameters, a wafer map, an alignment parameter, an addressing parameter, and a length measurement parameter. The wafer map is a coordinate map of the surface of a semiconductor wafer (for example, the coordinates of a pattern). The alignment parameter is, for example, a parameter used to correct a deviation between the coordinate system of the surface of the semiconductor wafer and the coordinate system inside the semiconductor inspection device 1. The addressing parameter for example, information for specifying a characteristic pattern present in an inspection target region among patterns formed on the surface of the semiconductor wafer. The length measurement parameter is a parameter describing a condition for measuring the length, and is, for example, a parameter for designating a portion of the pattern at which the length is to be measured among patterns.

The measurement result includes a length measurement result, image data, and an operation log. The length measurement result describes the result of measuring the length of the pattern on the surface of the semiconductor wafer. The image data is an observation image of the semiconductor wafer. The operation log is data describing an internal state of the semiconductor inspection device 1 in each operation step of alignment, addressing, and length measurement. For example, the operating voltage of each component, the coordinates of an observation field, and the like are exemplified.

The error result is a parameter indicating, when an error has occurred, in which of the operation steps of alignment, addressing, and length measurement the error has occurred.

Data such as the device data, the recipe, the measurement result, and the error result is accumulated in the database 2 via the network 101. The error cause estimation Device 3 analyzes the accumulated data. The analysis result is displayed in a format that can be read by a user in the terminal 4.

Figure 2:
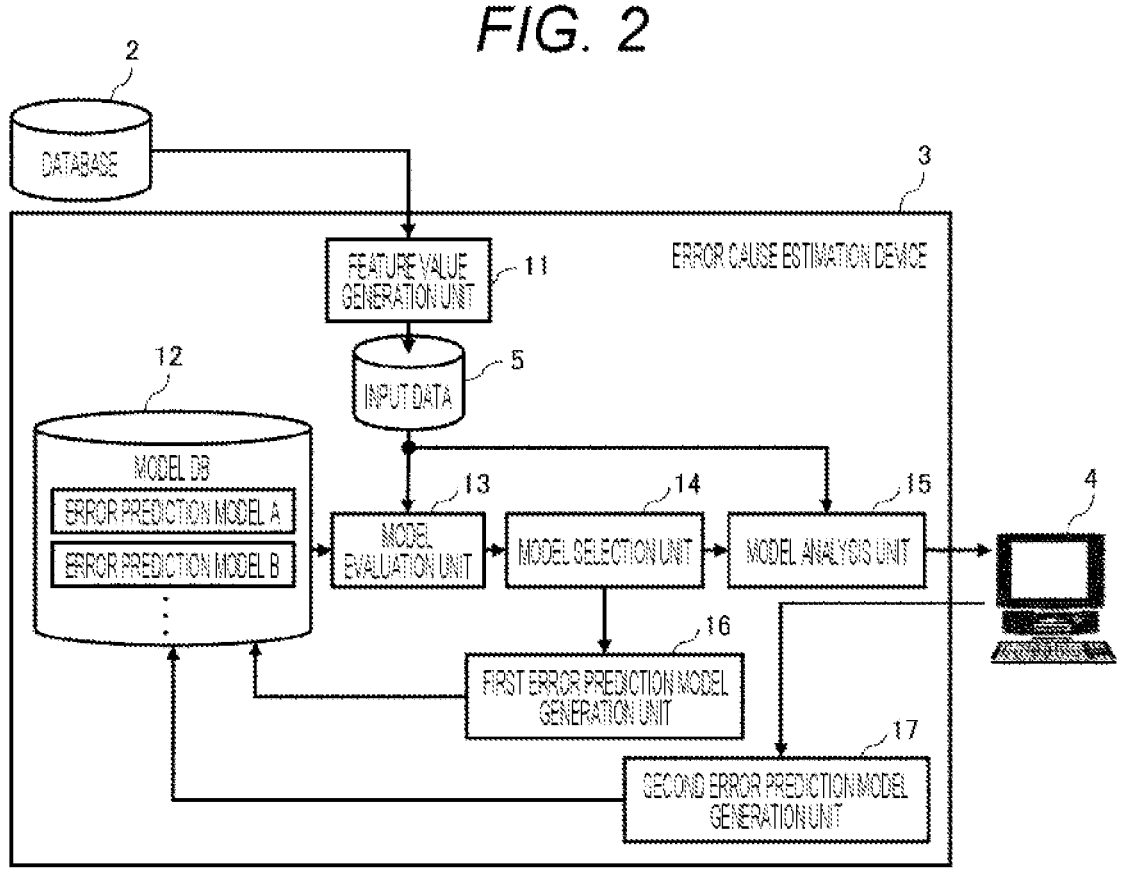
FIG. 2 is a configuration diagram illustrating the error cause estimation device in FIG. 1.

FIG. 2 illustrates the detailed configuration of the error cause estimation device in FIG. 1.

In FIG. 2, the error cause estimation device 3 includes a feature value generation unit 11 connected to the external database 2, an input data recording unit 5, a model database 12 (model DB), a model evaluation unit 13, a model selection unit 14, a model analysis unit 15, a first error prediction model generation unit 16, and a second error prediction model generation unit 17. The first error prediction model generation unit 16 is also simply referred to as an "error prediction model generation unit". The second error prediction model generation unit 17 is also referred to as "another error prediction model generation unit".

The feature value generation unit 11 extracts a feature value suitable for a machine learning model from raw data of device data, a recipe, a measurement result, and the like transmitted from the database 2, and outputs the feature value to the input data recording unit 5. Here, the extraction of the feature value may include scaling of data, encoding categorical variables, complex feature value creation in which a plurality of pieces of data are combined, for example, an interaction feature value, and the like.

In the model database 12, at least one or more error prediction models used in determining the presence or absence of the occurrence of an error at each inspection point are recorded. in advance by using the data in the input data recording unit 5 as an input. A model generated in another semiconductor manufacturing factory or manufacturing line may be diverted for the initial error prediction model that has been recorded in advance, or the initial error prediction model may be constructed based on a model generation procedure described later for any error in the database 2.

The model evaluation unit 13 evaluates the performance of the error prediction model in the model database 12 for data in the input data recording unit 5, for example, in units of recipes, wafers, inspection points, and the like. The performance evaluation is obtained by comparing an error prediction result determined using the error prediction model to a true error result in the input data recording unit 5. As an evaluation value of the performance, accuracy, a reproduction rate, a matching rate, an F1 value, AUC, and the like can be used. Here, the F1 value is a harmonic average of the matching rate and the reproduction rate. AUC is an abbreviation for Area Under the Curve.

The model selection unit 14 selects one or more models having a high evaluation value in the model evaluation unit 13, as models suitable for determining an error included in the input data recording unit 5. As a method of selecting a model, a defined value is set in advance for the evaluation value used by the model evaluation unit 13, and the model is selected from models having evaluation values that are greater than or equal to the defined value.

When there is no model having an evaluation value that is greater than or equal to the set defined value in the model selection unit 14, it is determined that a new error not matching with the generated error prediction model has been input, and the first error prediction model generation unit 14 generates a new error prediction model.

The model analysis unit 15 analyzes how much each feature value in the input data recording unit 5 contributes to the error determination for the error prediction model selected by the model selection unit 14, thereby extracting the feature value indicating a high correlation with the error.

Figures 3, 4:
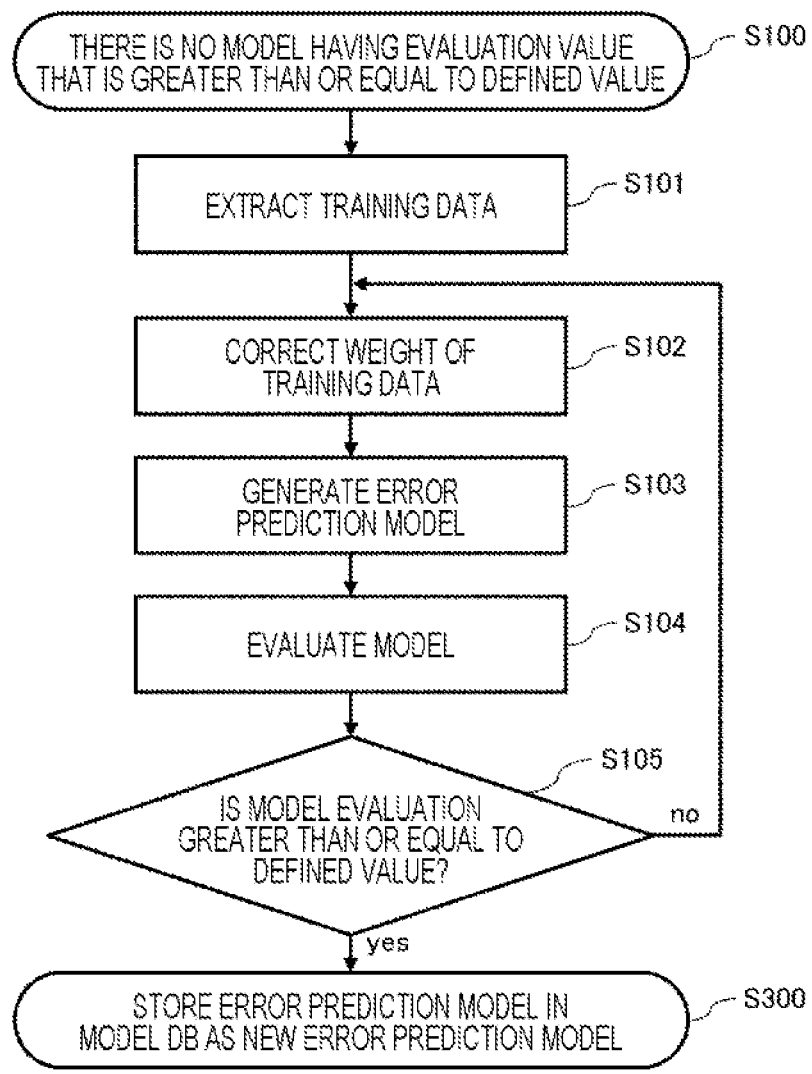
FIG. 3 is a flowchart illustrating a procedure for generating a new error prediction model in a first error prediction model generation unit according to Example 1.
FIG. 4 is a table illustrating an example of a data structure of input data according to Example 1.

FIG. 3 illustrates a procedure for generating a new error prediction model in the first error prediction model generation unit 16 in FIG. 2.

When it is determined in Step S100 that there is no model having an evaluation value that is greater than or equal to or greater than the set defined value as described above, the process proceeds to Step S101.

In Step S101, training data necessary for generating an error prediction model is selected (extracted). As a selection method, data including the same, recipe or a similar recipe as or to the error that could not be detected by the error prediction model is extracted from the Ca abase 2 or the input data recording unit 5.

Then, in Step S102, the weighting of which feature value of the training data is preferentially used is corrected correction method, for example, a known parameter search method such as random search or. Bayesian optimization can be utilized.

In Step S103, an error prediction model, which is a learning model used in determining the presence or absence of the occurrence of an error included in training data, is generated based on the weight calculated in Step S102 using the training data as an input. The error prediction model may be generated by using any machine learning algorithm such as a decision tree or a neural network.

In Step S104, the performance of the error prediction model generated in Step S103 is evaluated. As an evaluation method, similarly to the model evaluation unit 13 (FIG. 2), indices such as accuracy, the reproduction rate, the matching rate, the F1 value, and AUG can be used. In addition, desirably, the evaluation values may be calculated by using a method such as cross verification.

In Step S105, it is determined whether or not the evaluation value calculated in Step S104 is greater than or equal to predetermined defined value. When the evaluation value is less than the defined value, the process returns to Step S102 and the similar processes are repeated again. When the evaluation value is greater than or equal to the defined value, it is determined that generation of a new error model is completed, and stores the generated new error model in the model database 12 (FIG. 2).

As a method of selecting a similar recipe, for example, a recipe can be selected in which a parameter indicating registration information of a pattern formed on the surface of the semiconductor wafer or a value of a measurement magnification is close. When extraction from the database 2 is performed, the feature value generation unit 11 generates the feature value in a format suitable for the machine learning model. In addition, a period of data to be extracted may be designated. In the case of past data, there is a probability that a manufacturing condition of the wafer or a state of the device has changed. Thus, it is desirable to designate a period for extracting data backward from the time of the occurrence of the error.

Furthermore, the training data may include an operation step in which an error as a target (prediction target) has occurred and a recipe or a measurement result in a previous operation step. The measurement in the semiconductor inspection device 1 (FIG. 1) includes continuous operation steps such as alignment, addressing, and length measurement.

FIG. 4 is a table illustrating an example of a data structure of the input data including the value of the feature value obtained from the measurement in the semiconductor inspection device.

FIG. 4 illustrates the ti as of the feat ire values (Z1, Z2, . . . , Zm), the operation step, and the presence or absence of the occurrence of an error (error result) with respect to each measurement Index.

In FIG. 4, an error occurs when the measurement Index is 2 and the operation step is 2. In this case, the feature value of an operation step 3 and the subsequent steps after the operation step 2 may be excluded as being irrelevant to the occurrence of the error. However, there is a probability that the previous operation step 1 has an influence on the error, and thus is included in the training data.

As described above, when an error that cannot be handled by the learned model occurs, it is possible to generate an error prediction model for each error cause without performing annotation in advance, by generating a new prediction model as new error.

Next, a method of calculating the contribution degree to the error determination in the model analysis unit 15 and a method of visualizing the calculation result to the user will be described.

Figure 5:
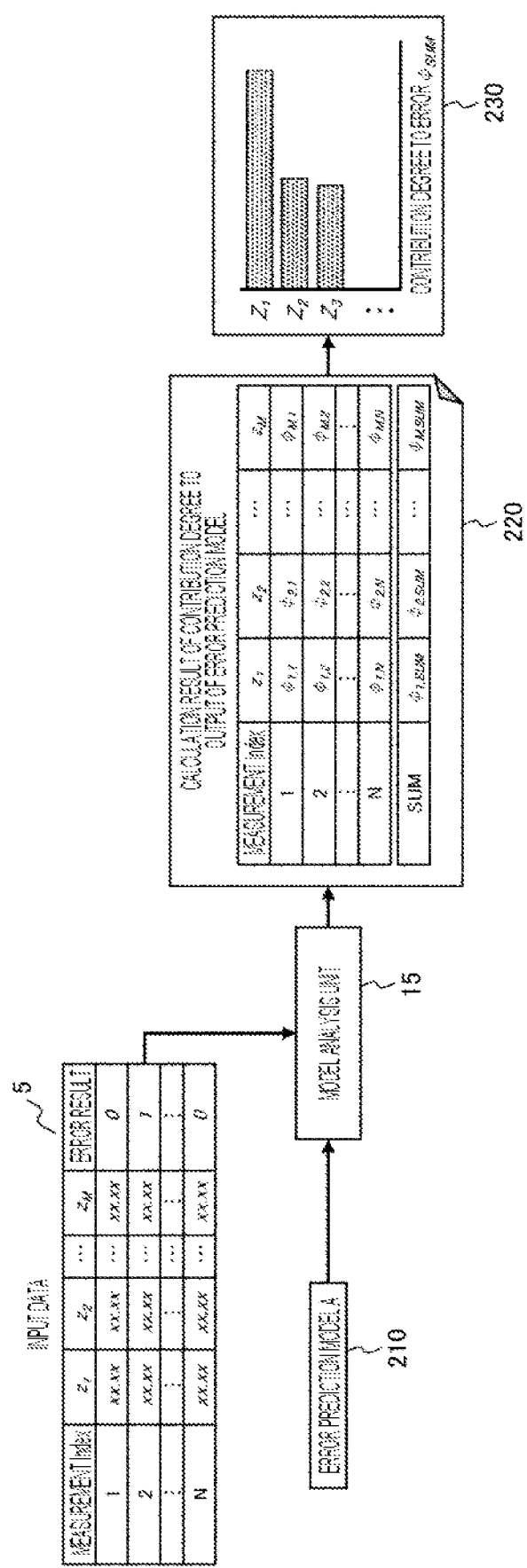
FIG. 5 is a schematic diagram illustrating an example of a process and a display in a model analysis unit in FIG. 2.

FIG. 5 is a schematic diagram illustrating the calculation of the contribution degree of the feature, value input to the error prediction model and the visualization method for a user.

In FIG. 5, the input data of the input data recording unit 5 and an error prediction model A (210) in the model database 12 (FIG. 2) are input to the model analysis unit 15. Then, a calculation result 220 of the contribution degree is output, and a graph 230 of the contribution degree of each feature value to the error can be displayed. In other words, the contribution degree of the feature value is quantified. Here, an example is illustrated in which the input data of the input data recording unit 5 has a data structure in which values of feature values (Z1, Z2, . . . , and Zm) and an error occurrence result are stored for each measurement Index allocated for each operation step of alignment, addressing, and length measurement will be described.

For example, when the error prediction model is constructed by an algorithm based on the decision tree, the contribution degree of the feature value to the error determination result in the error prediction model can be evaluated by the variable importance (Feature Importance) calculated based on the number of occurrences of each feature value in the branch in the model, the improvement value of the objective function, and the like, and the SHAP value for calculating the sensitivity of the value of each feature value to the model output. Here, SHAP is a method for obtaining the contribution of each variable (feature value) to the prediction result of the model, and is an abbreviation of SHapley Additive exPlanations.

When the model selected by the model selection unit 14 in FIG. 2 is the error prediction model A, for example, data of a row having a measurement Index of 1 is input to the input of the error prediction model A, and a φ contribution degree to the error determination is calculated based on a difference between the output results of the error prediction model A when the feature value $Z_1$ is included and when the feature value $Z_1$ is excluded. By repeating this calculation for all the feature values and all the measurement Indices, it is possible to quantify the degree of the influence of each feature value on the determination result of the prediction model. The sum $φ_{sum}$ of the SHAP values in each feature value can be displayed on terminal 4 in descending order of value. In other words, the feature value having a high value of the contribution degree calculated by the model analysis unit 15 can be presented to the user via the terminal 4 or the like as an error cause candidate.

As described above, by analyzing the sensitivity of the feature value to the error prediction model in the input data recording unit 5, it is possible to present, to the user, the feature value having a high correlation with the error.

Furthermore, by selecting a model having good performance for the data input by the model selection unit 14, even when error data having various features is mixed in the data, it is possible to avoid extraction of a low-related feature value as noise, and to enhance the accuracy of the extracted feature value.

In addition, when two or more models are selected by the model selection unit 14 describe above, analysis results of the plurality of models may be combined to present a feature value having a high correlation.

Next, a method for presenting error cause candidates when the model selection unit 14 selects the error prediction model A and the error prediction model B as the two models will be described.

Figure 6:
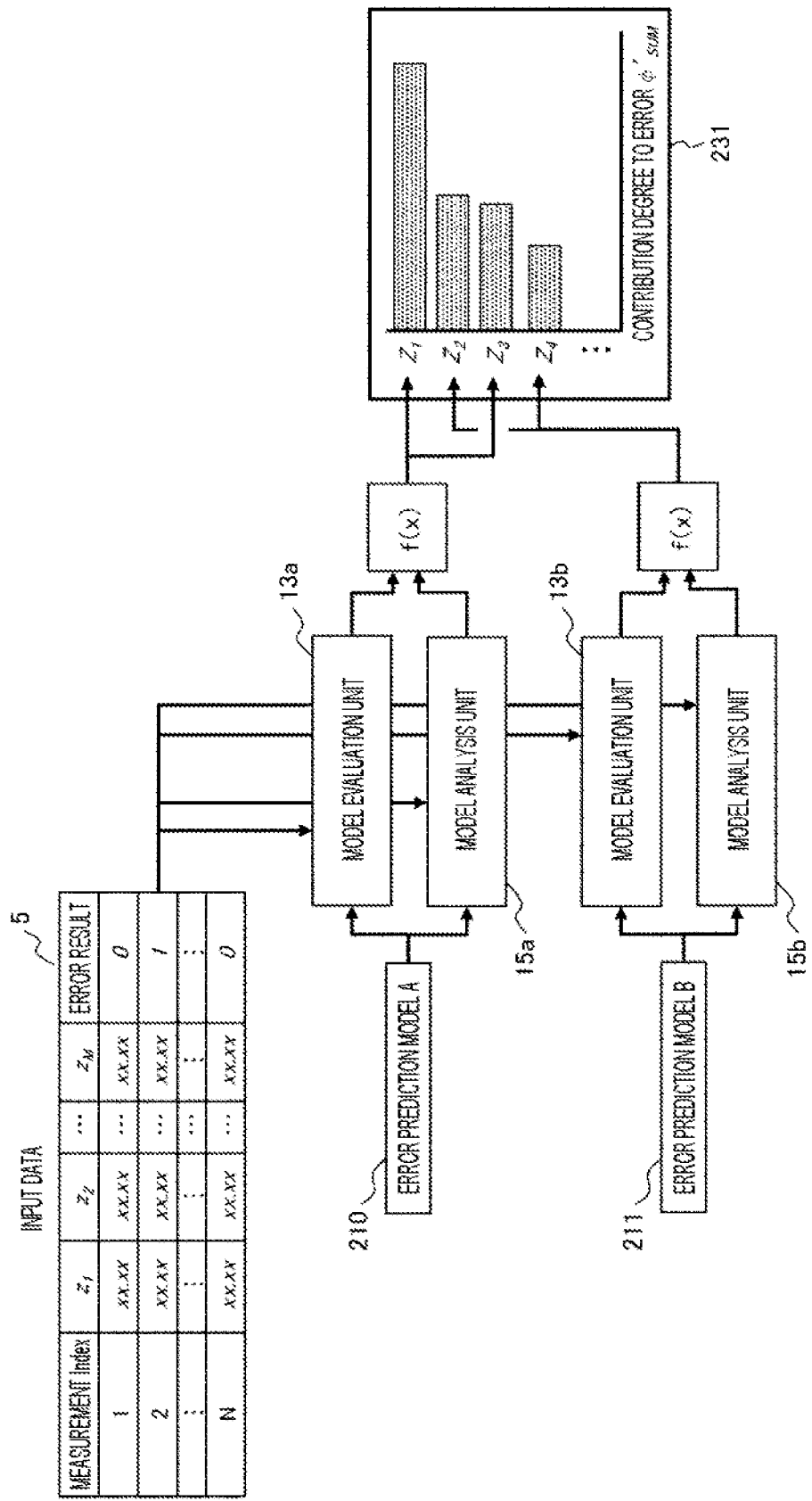
FIG. 6 is a schematic diagram illustrating an example of a process and a display in a model evaluation unit and the model analysis unit according to Example 1.

FIG. 6 is a schematic diagram illustrating an example of a process and a display in the model evaluation unit and the model analysis unit according to the present example.

In FIG. 6, the input data of the input data recording unit 5 and the error prediction model A (210) in the model database 12 (FIG. 2) are input to a model evaluation unit 13*a* and a model analysis unit 15*a*. In addition, the input data of the input data recording unit 5 and an error prediction model B (211) in the model database 12 (FIG. 2) are input to a model evaluation 13*b* and a model analysis unit 15*b*. Then, a graph 231 of the contribution degree of the feature value to the error can be displayed.

The functions of the model evaluation units 13*a* and 13*b* and the model analysis units 15*a* and 15*b* are simper to those in FIG. 2. Further, in FIG. 6, two model evaluation units 13*a* and 13*b* and two model analysis units 15*a* and 15*b* are illustrated for the description, but actually, processes may be executed in order or in parallel by one of the modes evaluation units 13*a* and 13*b* and one of the model analysis units 15*a* or and 15*b*, respectively.

In FIG. 6, the final contribution $\varphi'_{sum}$ is calculated correcting the sum $\varphi_{sum}$ of the SHAP values for each feature value calculated by the model analysis units 15*a* and 15*b* with the model evaluation values obtained by the model evaluation units 13*a* and 13*b*. Most simply, for example, when the modelability evaluation indexes in the model evaluation units 13*a* and 13*b* are reproduction rates, the final contribution degree $\varphi'_{sum}$ can be obtained by multiplying the SHAP value $\varphi_{sum}$ by the reproduction rate of the model. By displaying the final contribution degree $\varphi'_{sum}$ calculated each error prediction model in descending order of values, it is possible to present, to the user, feature value having a hind correlation with a combined error from a plurality of models, via the terminal 4 in a ranking format.

Furthermore, an example in Which the relationship between the value of the feature value and the contribution degree to the error is visualized with respect to the feature value of a top ranking rank with high contribution degree, with respect to the occurrence of the error, will be described.

Figure 7:
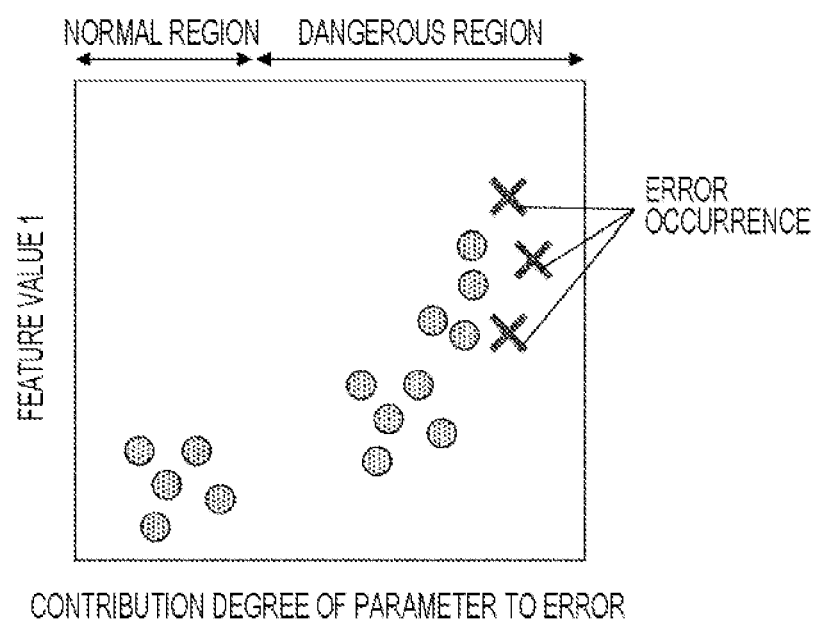
FIG. 7 is a graph illustrating an example of a relationship between a value of a feature value and a contribution degree to an occurrence of an error according to Example 1.

FIG. 7 is a graph illustrating an example of the relationship between the value of the feature value and the contribution degree to the occurrence of the error according to the present example. The horizontal axis represents the feature value, and the vertical axis represents the contribution degree of the parameter to the error occurrence.

As illustrated in FIG. 7, the determination of a normal area and a dangerous area based on the value of the contribution degree to the error and the display of the actual error occurrence position on the screen of the terminal 4 allow the user to evaluate the validity of the extracted feature value.

When the error cause selected in FIG. 2 is different from the actual error cause, the user can designate (correct) the correct error cause via the terminal 4. When the designation is performed, the second error prediction model generation unit 17 generates a new error prediction model.

Next, a model generation procedure in the second error prediction model generation unit 17 will be described.

Figure 8:
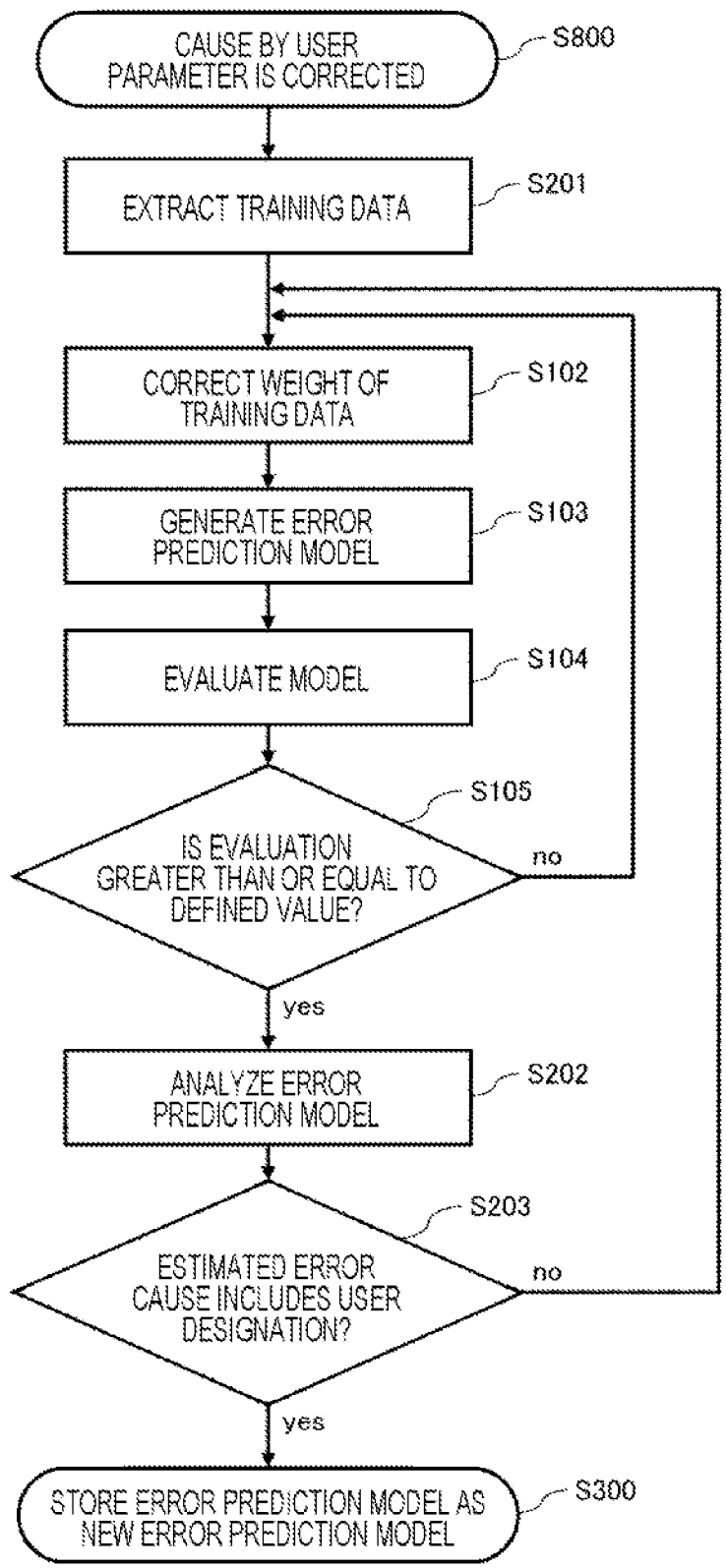
FIG. 8 is a flowchart illustrating a second error prediction model generation procedure according to Example 1.

FIG. 8 is a flowchart illustrating a second error prediction model generation procedure according to the present example.

In FIG. 8, when the cause parameter is corrected by the user (Step S800), the process proceeds to Step S201.

In Step S201, training data necessary for generating an error prediction model is selected (extracted). The selection method is different from Step S101 in FIG. 3. In Step S201 in FIG. 8, data including the same recipe or a similar recipe for the error detected by the error prediction model is extracted.

The subsequent processes of S102 to S105 in FIG. 8 are similar to those in FIG. 3.

Then, in Step S202, the error prediction model is analyzed, and the contribution degree to the error determination in the feature value in the training data extracted in Step S201 is quantified. This is a process similar to that of the model analysis unit 15 in FIG. 2.

In Step S203, when the error cause designated by the user is not included in the feature value having the high contribution degree in predetermined order, the similar processes are repeated from S102. When the error cause is included, it is determined that generation of a new error prediction model is completed, and the error prediction model is stored in the model database 12 (Step S300).

As described above, when the correct answer cannot be obtained by machine learning, it is possible to enhance the learning model by manually teaching the correct answer.

Example 2

Figure 9:
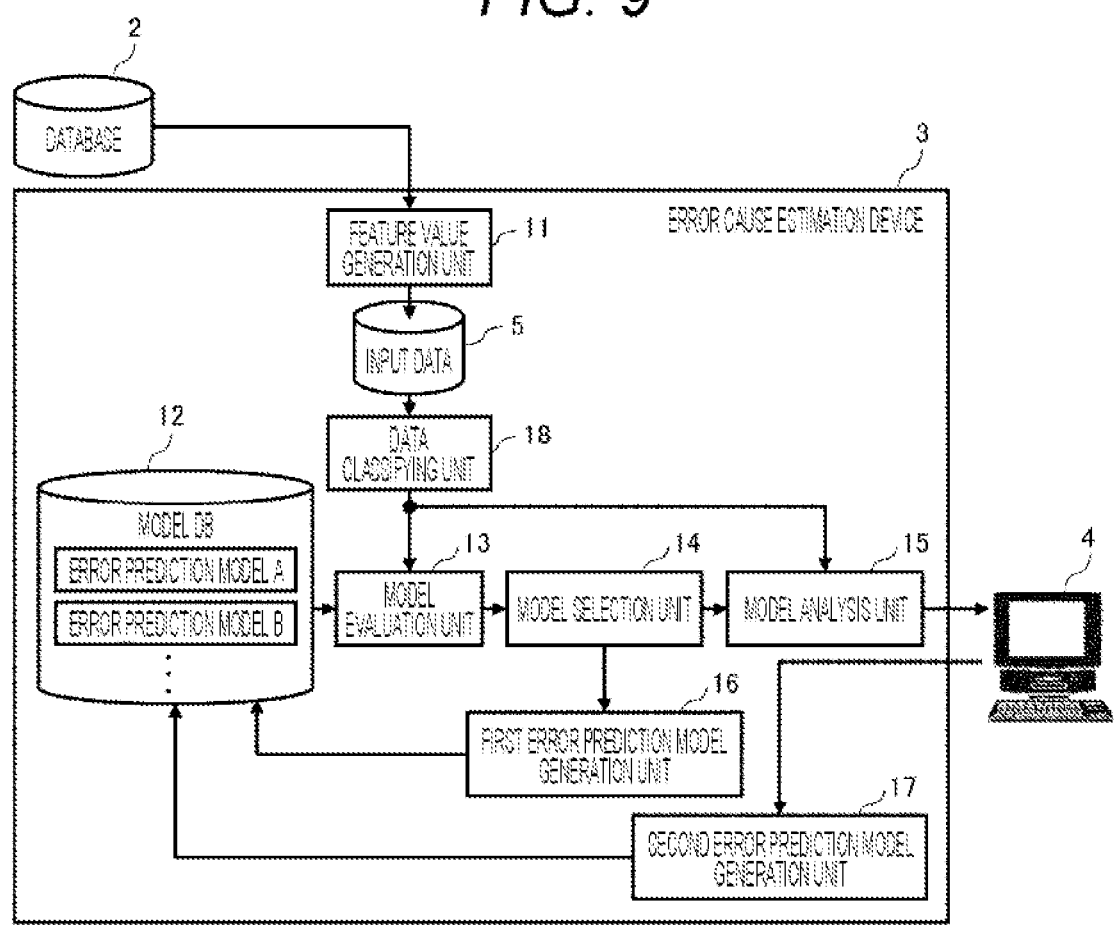
FIG. 9 is a configuration diagram illustrating an error cause estimation device including a data classifying unit according to Example 2.

FIG. 9 is a configuration diagram illustrating an error cause estimation device including a data classifying unit according to Example 2.

A difference between the present example (FIG. 9) and Example 1 is that a data classifying unit 18 that classifies data transmitted from the input data recording unit 5 is provided in the error cause estimation device 3. Other configurations are similar to those in FIG. 2.

In Example 1, under the definition that errors occurring in the same recipe are the same cause, model evaluation/model generation are performed by using data of the same recipe or a similar recipe.

On the other hand, in the present example (FIG. 9), the data classifying unit 18 classifies error data for each error cause, and performs model evaluation/model generation for each classified error data.

Next, the configuration of the data classifying unit 18 will be described.

FIG. 19 is a configuration diagram illustrating details of the data classifying unit in FIG. 9.

Figure 10:
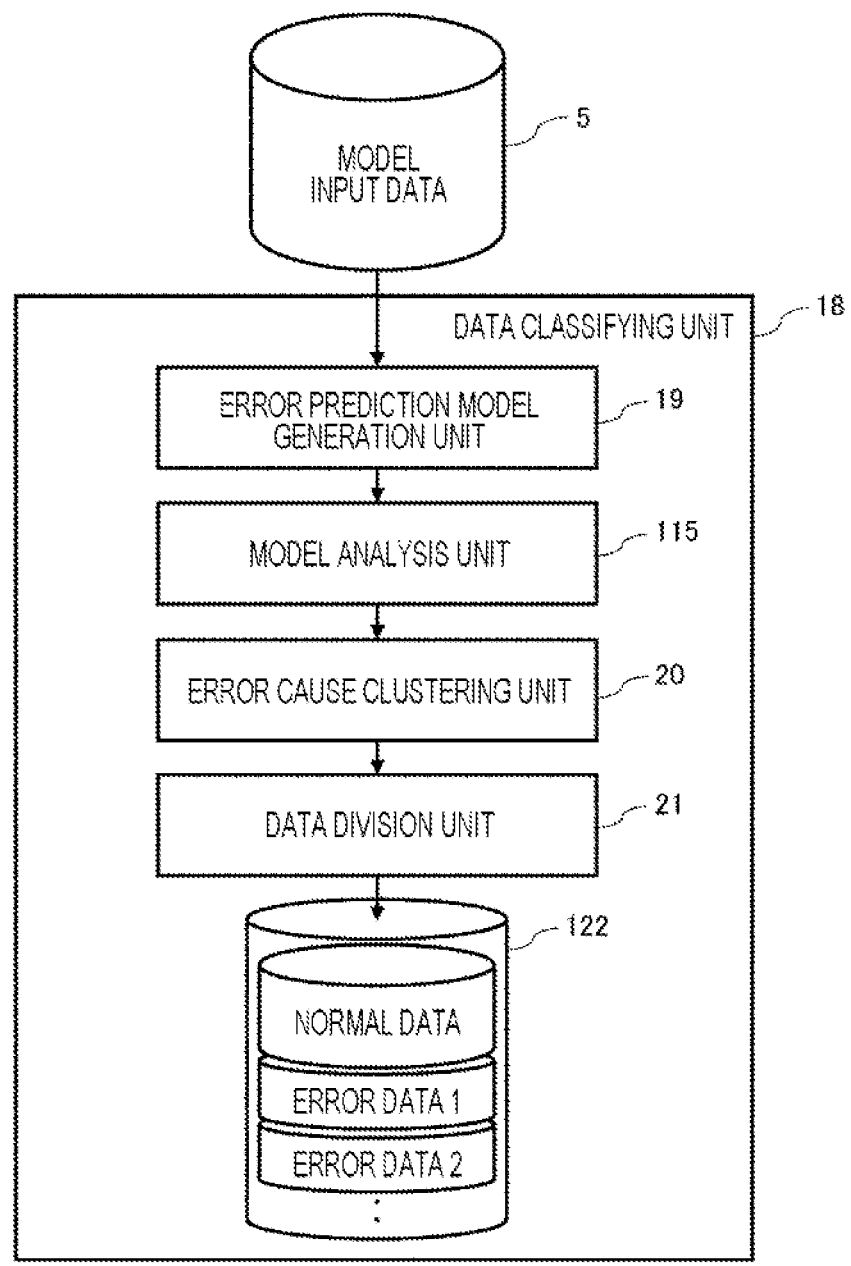
FIG. 10 is a configuration diagram illustrating the data classifying unit according to Example 2.

In FIG. 10, the data classifying unit 18 includes an error prediction model generation unit 19, a model analysis unit 115, an error cause clustering unit 20, a data division unit 21, and a divided data recording unit 122.

The error prediction model generation unit. 19 generates an error prediction model that is a learning model used in determining the presence or absence of the occurrence of an error included in input data transmitted from the input data recording unit 5. In the step in the error prediction model generation unit 19, the step similar to Step S103 in FIG. 8 can be used.

The model analysis unit 115 calculates how much each feature value contributes to the determination result of the model generated by the error prediction model generation unit 19, by using, for example, the SHAP value.

The error cause clustering unit 20 classifies the contribution degree of each feature value represented by the SHAP value calculated by the model analysis unit 115 to the error by applying unsupervised learning.

The data division unit 21 divides the data into classified errors and normal data. The divided data is stored in the divided data recording unit 122.

Next, the concept of this cluster will be described.

Figure 11:
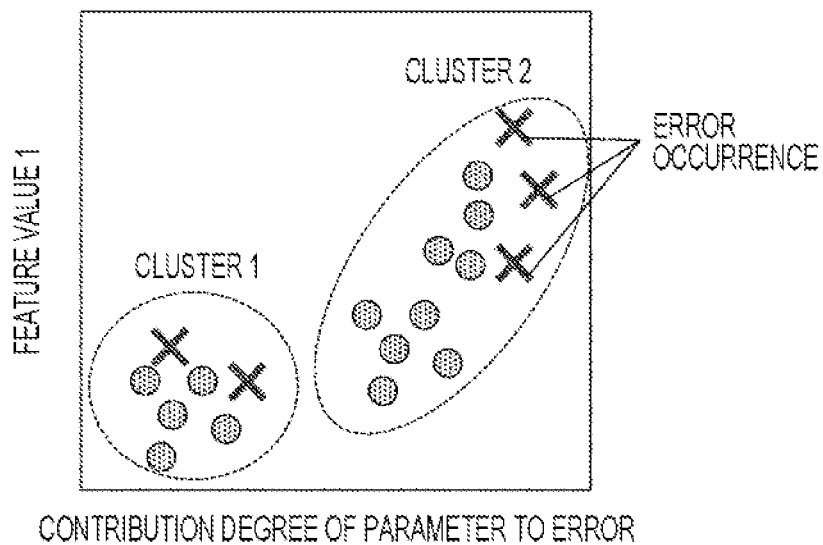
FIG. 11 is a graph illustrating a state in which error data is classified by using the relationship between the value of the feature value and the contribution degree to the occurrence of the error.

FIG. 11 is a graph illustrating a state in which error data is classified by using the relationship between the value of the feature value and the contribution degree of the parameter to the occurrence of the error. The horizontal axis represents the feature value, and the vertical axis represents the contribution degree of the parameter to the error occurrence.

In FIG. 11, Clusters 1 and 2 corresponding to different error causes are divided into respective areas, and data (error data) in which an error has occurred is separated. This is because, in an error having a different cause, a branch equation in the model for discriminating the error is also different, and the SHAP value indicating the contribution degree to the error determination is expected to have a different existence range for each feature value related to the error case. The error data is separated in accordance with the SHAP value.

The first error prediction model generation unit 16 and the second error prediction model generation unit 17 in FIG. 9 generate an error prediction model for the error data separated for each error cause in this manner, and the model analysis unit 15 analyzes the model. Therefore, even when there are a plurality of error causes that cannot be handled by, the error prediction model in the model database 12 in the input data of the input data recording unit 5, it is possible to avoid extraction of a low-related feat; re value as noise and to enhance the accuracy of the extracted feature value. Here, when the error prediction model is generated by using the error data divided by the data classifying unit 18, it is possible to use normal data that is the same recipe, as or a similar recipe to the target error data together as the training data.

In addition, a different label may be provided for each piece of classified error data, and an error prediction model may be generated together with the label and stored in the model database 12. In this labeling, different indices may be automatically assigned in order, or a user may label an error cause. Since the labeling of the error cause may be performed in units of divided data, it is possible to greatly reduce the number of processes as compared with the conventional method of performing labeling in units of one occurrence error. In this case, the model evaluation unit 13 in FIG. 9 is unnecessary, and the function of the model selection unit 14 is replaced with an operation of selecting one in which the label of the error data matches with the label of the error prediction model.

Third Example

In the error cause estimation device in Example 1, when a sufficient variation of the error prediction model is stored in the model database 12 in FIG. 2, a new error prediction model may not be generated, and only the estimation of the error cause may be performed on the in-out error data.

The configuration of an error cause estimation device in this case will be described as a third example.

Figure 12:
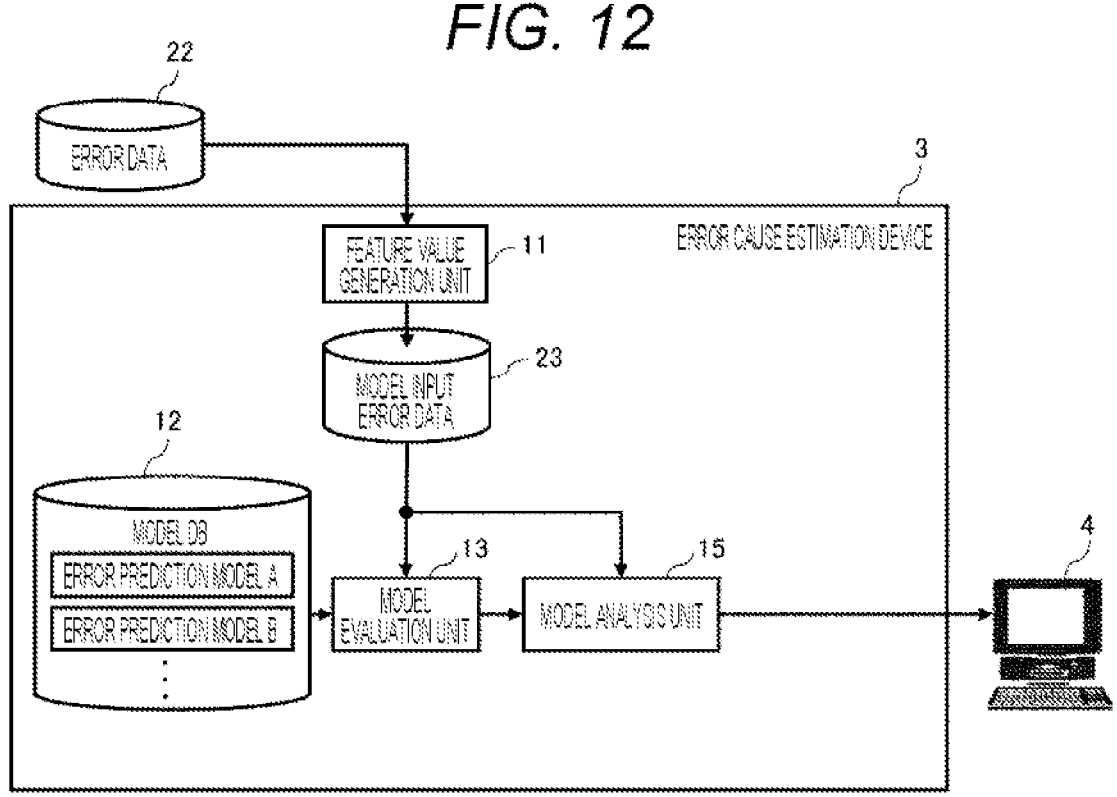
FIG. 12 is a configuration diagram illustrating an error cause estimation device that performs only error cause estimation according to Example 3.

FIG. 12 is a configuration diagram illustrating the error cause estimation device according to the present example.

In FIG. 12, as error data, a data set of a recipe/measurement result at a measurement point at which an error has occurred, and a recipe/measurement result in the same wafer and the same recipe are input from the database 22.

The feature value generation unit 11 extracts the feature value suitable for the machine learning model with respect to these pieces of data, and outputs error data to the model input error data recording unit 23.

The subsequent processes are similar to those is FIG. 2. One or more error prediction models having a high evaluation value with respect to the error prediction of the model input error data recording unit 23 are selected from the model database 12, and the feature value having a large contribution degree to the error prediction is presented to the user via the terminal as an analysis result of the model. In this case, the model selection unit 14 is unnecessary.

By limiting the function of the error cause estimation device 3 to the cause estimation of the error that has occurred, in this manner, it is possible to also minimise necessary input data.

Figure 13:
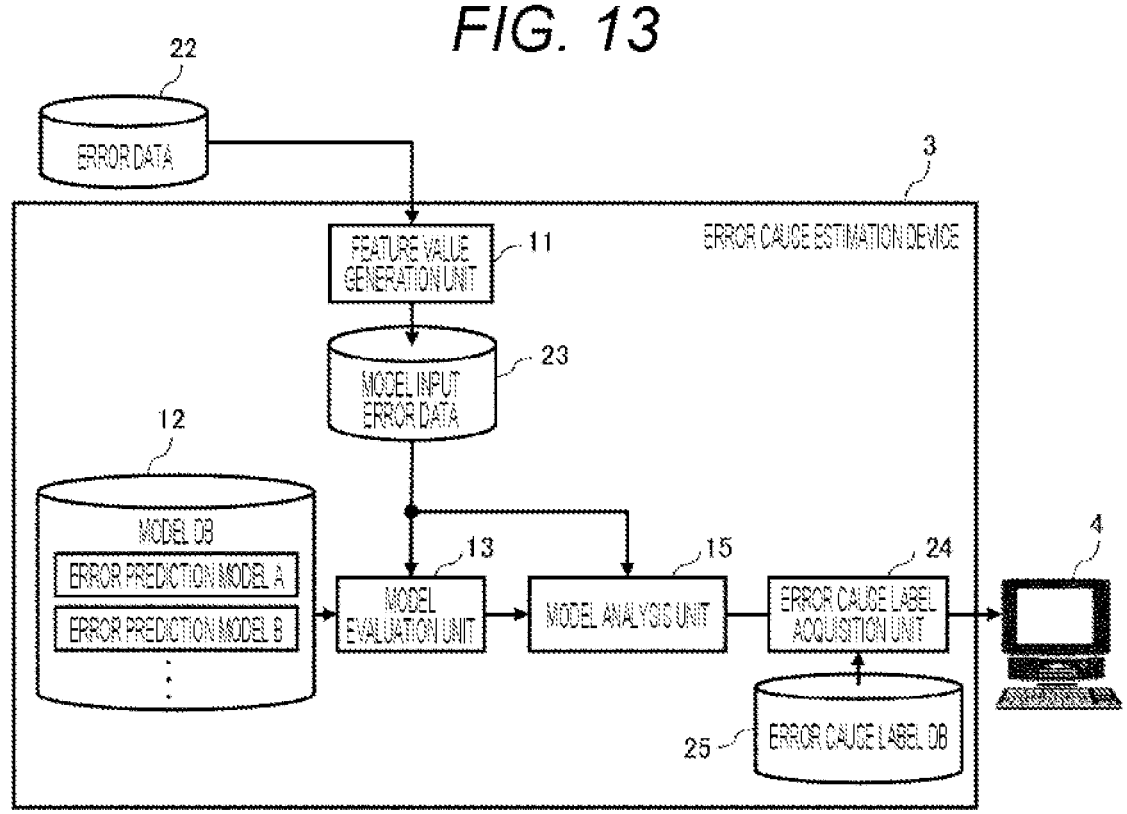
FIG. 13 is a configuration diagram illustrating an error cause estimation device including an error cause label acquisition unit and an error cause label database according to Example 3.

FIG. 13 a configuration diagram illustrating a modification example of the error cause estimation device.

In FIG. 13, the error cause estimation device 3 includes an error cause label acquisition unit 24 and an error cause label database 25 (error cause label DB). Thus, it is possible to acquire an error cause candidate based on the feature value extracted by the model analysis unit 15.

The error cause label database 25 stores the relationship between each feature value and the error cause corresponding to a combination of the feature values. In this case, labeling of the error cause to the feature value is required in advance, but the required number of processes can be greatly reduced as compared with labeling in units of one occurrence error which is conventional method.

The error cause label acquisition unit 24 assigns the corresponding error cause to the feature value of the ranking higher rank obtained by the model analysis unit 15, by using the label relationship in the error cause label database 25.

This labelled error cause is presented to the user via the terminal 4. At this time, the magnitude of the contribution degree of each feature value calculated by the model analysis unit 15 may be converted and displayed as the certainty of the corresponding error cause.

Next, an example of this display will be described.

Figure 14:
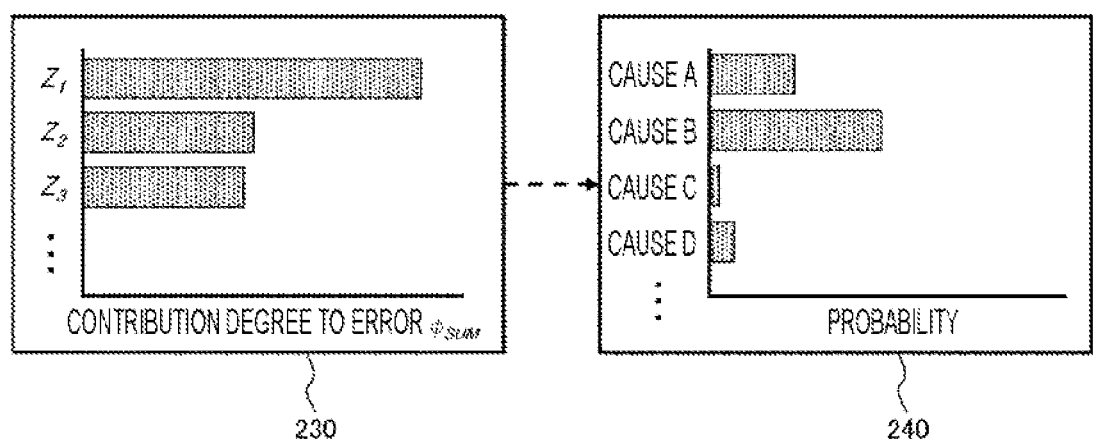
FIG. 14 is a diagram illustrating error cause candidates for a user according to Example 3.

FIG. 14 illustrates a display example of error cause candidates to the user according to the present example.

The graph on the right side in FIG. 14 illustrates the magnitude of the contribution degree each feature value calculated by the model analysis unit 15. The graph on the left side in FIG. 14 illustrates the certainty of the error cause converted based on the data illustrated in the graph on the right side.

In this manner, the error prediction model is analyzed to calculate the feature value contributing to the error determination, and the error cause corresponding to each feature value or the combination thereof is labeled, thereby the feature value correlated with the occurred error and the corresponding error cause candidate can be presented to the user.

<Others>

The present invention is not limited to the above-described examples, and various modification examples may be provided. The above examples are described in detail in order to explain the present invention in an easy-to-understand manner, and the above examples are not necessarily limited to a case including all the described configurations. For example, the error cause label acquisition unit 24 and the error cause label database 95 illustrated in FIG. 13 in Example 3 can also be combined with FIG. 2 in Example 1 and FIG. 9 in Example 2, and each feature value and the error cause associated with the combination of the feature values can be presented to the user.

In the above-described examples, the example of estimating the error cause of the semiconductor inspection device has been described, but the present invention can also be applied to a device other than the semiconductor inspection device by generating a parameter for defining the operation of the device and a prediction model as to whether or not an error occurs when the parameter is adopted.

Furthermore, in the above-described examples, an example of quantifying the contribution degree of the feature value to the error prediction model by using the SHAP value has been described, but ether evaluation values such as Feature Importance can be applied.

REFERENCE SIGNS LIST 1 semiconductor inspection device
2, 22 DATABASE
3 ERROR CAUSE ESTIMATION DEVICE
4 terminal
5 input data recording unit
11 feature value generation unit
12 model database
13, 13a, 13b MODEL EVALUATION UNIT
14 MODEL SELECTION UNIT
15, 15a, 15b, 115 MODEL ANALYSIS UNIT
16 FIRST ERROR PREDICTION MODEL GENERATION UNIT
17 SECOND ERROR PREDICTION MODEL GENERATION UNIT
18 DATA CLASSIFYING UNIT
19 ERROR PREDICTION MODEL GENERATION UNIT
20 ERROR CAUSE CLUSTERING UNIT
21 DATA DIVISION UNIT
23 model input error data recording unit
24 ERROR CAUSE LABEL ACQUISITION UNIT
25 error cause label database
101 network

The invention claimed is:

1. A method, implemented by a semiconductor inspection system comprising a scanning electron microscope and an inspection controller, for detecting a cause of an error in manufacturing a semiconductor wafer, the method comprising:
　　collecting feature values for training a plurality of error prediction models, wherein the error prediction models are each a machine learning model and the feature values comprise process and inspection measurements of a plurality of semiconductor wafers manufactured and evaluated in a first period;
　　constructing the plurality of the error prediction models using the feature values to form a plurality of trained error prediction models;
　　storing the plurality of trained error prediction models in a database;
　　receiving new feature data, wherein the new feature data comprises process and inspection measurements of another semiconductor wafer manufactured and evaluated in a second period;
　　evaluating performance of the plurality of trained error prediction models using the new feature data, wherein the evaluating comprises comparing a predicted error output of each error prediction model to a corresponding actual measured error result;
　　generating a new error prediction model when an evaluation value calculated by the evaluating for each of the plurality of trained error prediction models is less than a preset defined value;
　　adding the new error prediction model to the plurality of trained prediction models stored in the database;
　　receiving measurement data of the semiconductor wafer manufactured and evaluated in a third period; and
　　detecting the cause of the error in the manufacturing of the semiconductor wafer by inputting the measurement data into a selected trained learning model among the plurality of trained error prediction models stored in the database, wherein detecting the cause comprises outputting a predicted error cause associated with a specific process step in the manufacturing of the semiconductor wafer, and
　　wherein the process and inspection measurements include device data and recipe parameters produced by the semiconductor inspection system during alignment, addressing, and length-measurement operation steps, the device data including an observation-condition parameter of the scanning electron microscope and an operation log, and the recipe parameters including a wafer map, an alignment parameter, an addressing parameter, and a length-measurement parameter.

2. The method according to claim 1, wherein the plurality of trained error prediction models are trained to
　　classify a cause of the plurality of error causes to form a classified error cause.

3. The method according to claim 2, further comprising separately labeling the classified error cause,
　　generating an additional error prediction model with the label, and
　　adding the additional error prediction model to the plurality of trained prediction models stored in the database.

4. The method according to claim 1, further comprising: presenting a user the selected trained learning model.

5. The method according to claim 1, further comprising:
　　storing, in an error cause label database, a relationship of the feature values generated and an error cause corresponding at least any one of combinations of the feature values; and
　　assigning a corresponding error cause to one or more of the feature values corresponding to the contribution degree quantified by using a label relationship in the error cause label database.

6. The method according to claim 1, wherein the evaluating includes:
　　quantifying a contribution degree of the feature values to an error determination result for a respective trained error prediction model.

7. The method according to claim 1, wherein the constructing is based on a decision tree.

8. The method according to claim 1, wherein the comparing is based on SHapley Additive explanations.

9. The method according to claim 1, wherein collecting the feature values comprises acquiring, from the scanning electron microscope and the inspection controller, image data of the semiconductor wafer and an operation log captured for the alignment, addressing, and length-measurement operation steps.

10. The method according to claim 6, further comprising causing a terminal to display a graph of contribution degree versus feature value including a normal region and a dangerous region and marking an error-occurrence position for the wafer.

11. The method according to claim 1, further comprising, responsive to the predicted error cause associated with the specific process step, transmitting, by the inspection controller, a configuration command that sets an observation-condition parameter of the scanning electron microscope for a subsequent inspection operation.

12. The method according to claim 1, wherein generating the new error prediction model uses training data that includes feature values from an operation step in which the error occurred and feature values from at least one immediately preceding operation step.

13. The method according to claim 6, wherein quantifying the contribution degree includes computing SHapley Additive explanations (SHAP) values for the feature values and presenting, on the terminal, a ranking of feature values by contribution degree.

14. The method according to claim 1, wherein the process and inspection measurements further include an observation-condition parameter of the scanning electron microscope comprising an acceleration voltage of an electron optical system.

* * * * *